(12) United States Patent
Shioya et al.

(10) Patent No.: US 9,086,614 B2
(45) Date of Patent: Jul. 21, 2015

(54) PROJECTION DISPLAY APPARATUS AND CONTROL METHOD THEREFOR

(75) Inventors: Yukinori Shioya, Tokyo (JP); Hiroki Tanaka, Tokyo (JP); Kenji Kanzaka, Tokyo (JP); Michio Kobayashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 242 days.

(21) Appl. No.: 13/814,224

(22) PCT Filed: Sep. 3, 2010

(86) PCT No.: PCT/JP2010/065137
§ 371 (c)(1),
(2), (4) Date: Feb. 4, 2013

(87) PCT Pub. No.: WO2012/029172
PCT Pub. Date: Mar. 8, 2012

(65) Prior Publication Data
US 2013/0127931 A1 May 23, 2013

(51) Int. Cl.
*G03B 21/14* (2006.01)
*G03B 21/20* (2006.01)
*H04N 9/31* (2006.01)

(52) U.S. Cl.
CPC ............ *G03B 21/14* (2013.01); *G03B 21/2053* (2013.01); *H04N 9/3155* (2013.01)

(58) Field of Classification Search
CPC .. G03B 21/14; G03B 21/2053; H04N 9/3155; G09G 3/3406; G09G 2320/0276

USPC ........ 345/204–212, 87–102; 353/85, 121, 97; 315/291
See application file for complete search history.

(56) References Cited

U.S. PATENT DOCUMENTS

| 6,979,085 B2 | 12/2005 | Lurkens et al. |
| 6,979,960 B2 | 12/2005 | Okawa et al. |

(Continued)

FOREIGN PATENT DOCUMENTS

| CN | 1510504 A | 7/2004 |
| CN | 1611069 A | 4/2005 |

(Continued)

OTHER PUBLICATIONS

English Translation of JP 2002-300498.*

(Continued)

*Primary Examiner* — Hong Zhou
(74) *Attorney, Agent, or Firm* — McGinn IP Law Group, PLLC.

(57) ABSTRACT

A projection display apparatus comprises a lamp; a display element that modulates light emitted from the lamp according to an amplitude of the image signal, and emits the light as the image light; a light intensity controller that changes a lamp power according to a power changing operation, and, if the changed lamp power is lower than a rated power of the lamp and supplied to the lamp for a certain period of time, increases the lamp power and then reduces the lamp power to an original power, identifies an amplitude of the image signal where an intensity of the image light is constant before and after the change of the lamp power; and an image signal controller that controls the amplitude of the image signal to the identified amplitude, and supplies the display element with the image signal.

20 Claims, 5 Drawing Sheets

(56) References Cited

U.S. PATENT DOCUMENTS

| | | | |
|---|---|---|---|
| 8,111,000 B2 | 2/2012 | Pekarski | |
| 2004/0136134 A1 | 7/2004 | Okawa et al. | |
| 2010/0002200 A1 | 1/2010 | Pekarski | |
| 2010/0128232 A1* | 5/2010 | Kagata et al. | 353/85 |
| 2011/0043771 A1* | 2/2011 | Hirao | 353/85 |

FOREIGN PATENT DOCUMENTS

| | | |
|---|---|---|
| CN | 101095376 A | 12/2007 |
| JP | 2002-300498 A | 10/2002 |
| JP | 2003-324670 A | 11/2003 |
| JP | 2004-207018 A | 7/2004 |
| JP | 2007-163684 A | 6/2007 |
| JP | 2008-527405 A | 7/2008 |
| JP | 2009-093862 A | 4/2009 |
| WO | WO 2006/072861 A1 | 7/2006 |

OTHER PUBLICATIONS

International Search Report dated Oct. 12, 2010 with English translation thereof.
Chinese Office Action Dated Aug. 5, 2014 with an English Translation thereof.

* cited by examiner

PROJECTION DISPLAY APPARATUS AND CONTROL METHOD THEREFOR

TECHNICAL FIELD

The present invention relates to a projection display apparatus and a control method therefor.

BACKGROUND ART

Projection display apparatus 10 shown in FIG. 1 includes power source 11, ballast 12, lamp 13, image signal controller 14, display element 15, and light intensity controller 16. In FIG. 1, an outline arrow indicates a light flux.

Ballast 12 adjusts the lamp power that is supplied from power source 11 to lamp 13 for driving lamp 13, according to a power control signal input from light intensity controller 16. Lamp 13 is lit by a lamp power supplied from power source 11 via ballast 12, and illuminates display element 15.

Image signal controller 14 receives an image signal from the outside, and outputs the image signal to display element 15. Display element 15 modulates light emitted from lamp 13 according to the amplitude of the image signal input from image signal controller 14, and emits the modulated light as image light. The image light emitted from display element 15 is projected as a projection screen on screen 20.

In the case of projection in a dark room or on a small screen using the projection display apparatus as described above, in which the projection screen is excessively bright, it is sometimes difficult to see the screen.

A projection display apparatus has been discussed in which light intensity controller 16 receives a power changing operation that is input from the outside so as to change the lamp power, and changes the lamp power according to the input power changing operation.

In the case of adopting the power changing operation, when the power changing operation is input, light intensity controller 16 outputs the power control signal to ballast 12 such that the lamp power according to the power changing operation is supplied to lamp 13.

Projection display apparatus 10 described above changes the lamp power according to the power changing operation, thereby allowing the luminance of lamp 13 to be varied to adjust the brightness of the image light.

Typically, the lamp of a projection display apparatus is a discharge lamp. Accordingly, lighting at a lamp power that is lower than a predetermined power (rated power) causes unstable light emission and damages the electrode and a luminous tube of the lamp.

Thus, Patent Document 1 (JP2009-093862A) discloses a technique that, if the lamp power is lower than the rated power for a certain period of time or longer, then a lamp refreshing process is carried out to temporarily increase the lamp power to the rated power at appropriate time intervals and then returns the power to the original lamp power after elapse of a predetermined period of time. According to the technique, even if lighting lamp power so that it is lower than the rated power damages the electrode and the luminous tube of the lamp, the lamp refreshing process can return the state of the electrode and the luminous tube to the normal state.

CITATION LIST

Patent Document

Patent Document 1: JP2009-093862A

SUMMARY OF INVENTION

Problem to be Solved by the Invention

However, in the case of applying the technique disclosed in Patent Literature 1 to projection display apparatus 10 shown in FIG. 1, lighting lamp 13 at a lamp power that is lower than the rated power according to the power changing operation sometimes varies the lamp power at timing that is not intended by a user, owing to a lamp refreshing process. Variation in lamp power, in turn, varies the luminance of lamp 13. This variation causes a problem of variation in the brightness of image light.

It is an object of the present invention to provide a projection display apparatus and a control method therefor that can solve the problem described above.

To achieve the object, according to the present invention, a projection display apparatus is a projection display apparatus projecting image light based on an image signal comprising:

a lamp;

a display element that modulates light emitted from the lamp according to an amplitude of the image signal, and emits the light as the image light;

a light intensity controller that changes a lamp power according to a power changing operation that is input from an outside so as to change the lamp power for driving the lamp, and, if the changed lamp power is lower than a rated power of the lamp and supplied to the lamp for at least a certain period of time, increases the lamp power to the rated power and then reduces the lamp power to an original power after elapse of a predetermined period of time, identifies an amplitude value of the image signal where an intensity of the image light is constant before and after the change of the lamp power, and generates a control signal for changing the amplitude of the image signal to the identified amplitude value; and an image signal controller that controls the amplitude of the image signal according to the control signal generated by the light intensity controller, and supplies the image signal whose amplitude is controlled to the display element.

To achieve the object, according to the present invention, a control method of a projection display apparatus is a control method of a projection display apparatus including a lamp and a display element that modulates light emitted from the lamp according to an amplitude of an image signal and emits the light as image light comprising:

causing a light intensity controller to change a lamp power according to a power changing operation that is input from an outside so as to change the lamp power for driving the lamp, and, if the changed lamp power is lower than a rated power of the lamp and supplied to the lamp for at least a certain period of time, to increase the lamp power to the rated power and then to reduce the lamp power to an original power after elapse of a predetermined period of time, to identify an amplitude value of the image signal where an intensity of the image light is constant before and after the change of the lamp power, and to generate a control signal for changing the amplitude of the image signal to the identified amplitude value; and causing an image signal controller to control the amplitude of the image signal according to the control signal generated by the light intensity controller, and to supply the image signal whose amplitude is controlled to the display element.

According to the present invention, a projection display apparatus can suppress variation in brightness of image light due to variation in lamp power.

DESCRIPTION OF EMBODIMENTS

Exemplary embodiments of the present invention will be described below with reference to the drawings.

First Exemplary Embodiment

Figure 1:
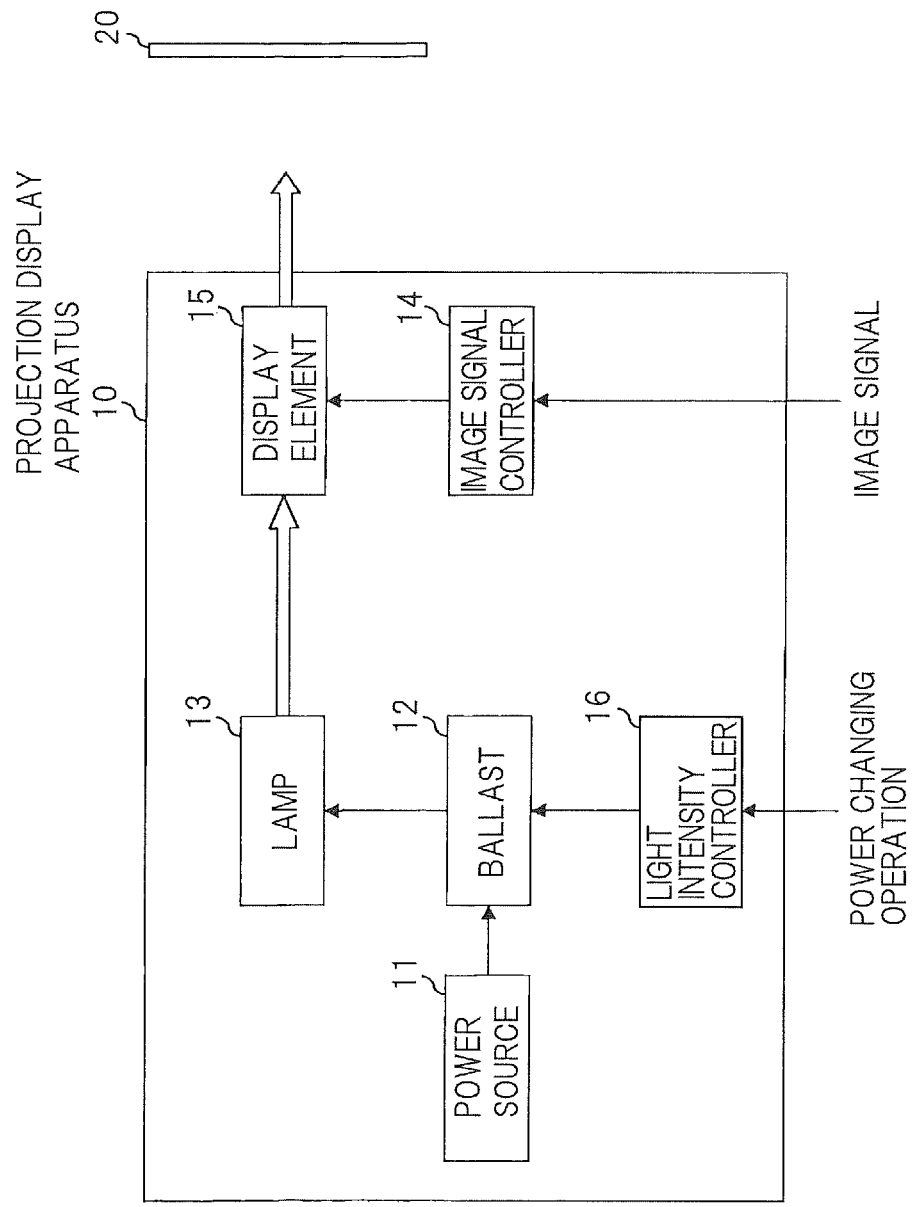
FIG. 1 is a block diagram showing a configuration of a related projection display apparatus.
Figure 2:
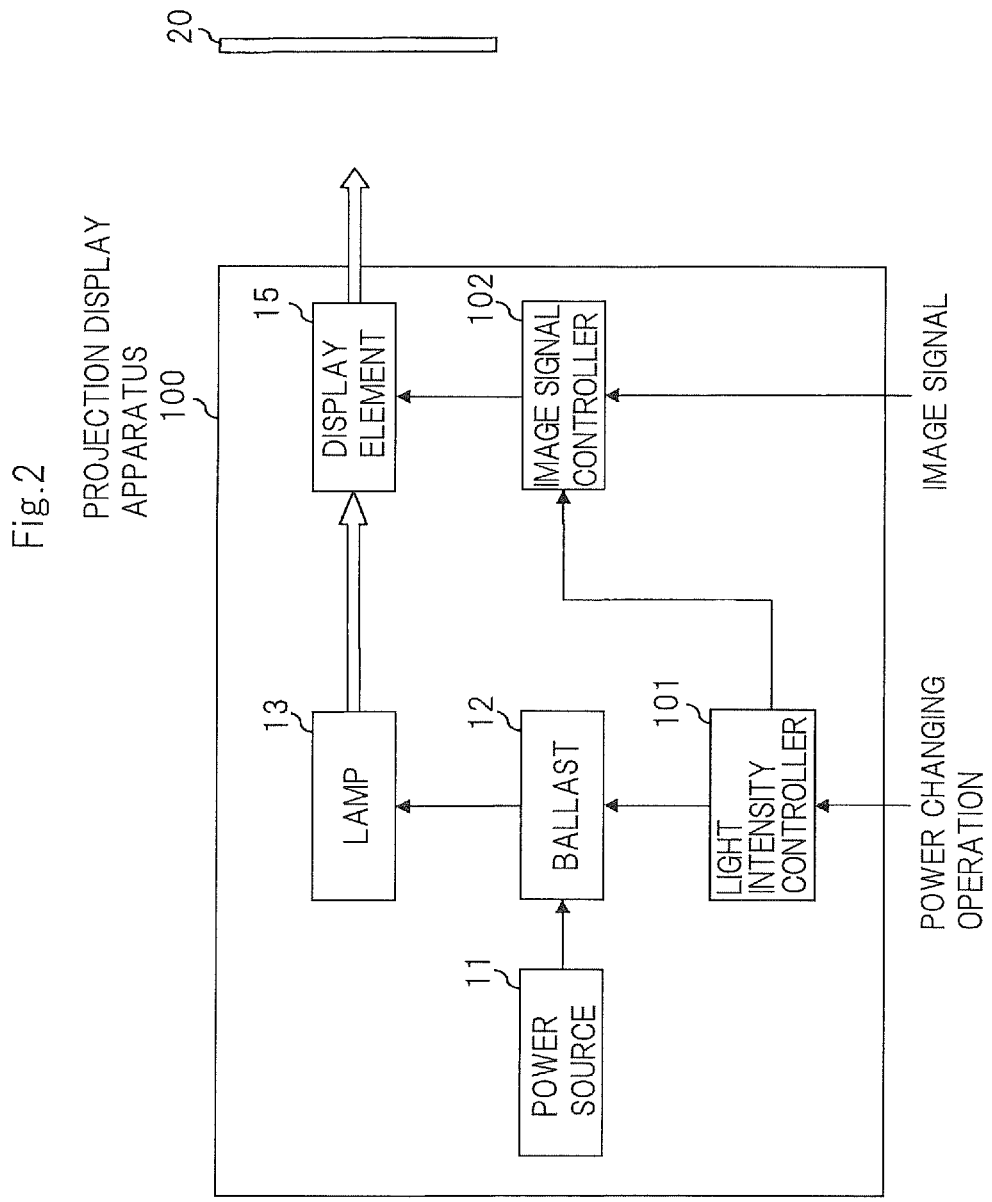
FIG. 2 is a block diagram showing a configuration of a projection display apparatus according to a first exemplary embodiment of the present invention.

FIG. 2 is a block diagram showing a configuration of projection display apparatus 100 according to a first exemplary embodiment of the present invention. Note that the same components as those in FIG. 2 as those in FIG. 1 are denoted by the same reference numerals and that a description thereof will be omitted. In FIG. 2, an outline arrow indicates a light flux.

Projection display apparatus 100 shown in FIG. 2 includes power source 11, ballast 12, lamp 13, display element 15, light intensity controller 101, and image signal controller 102.

An image signal supplied from the outside is input into image signal controller 102. A power changing operation is input into light intensity controller 101 from the outside.

Light intensity controller 101 generates a power control signal according to the power changing operation input from the outside, and outputs the signal to ballast 12.

If light intensity controller 101 detects that the lamp power changed according to the power changing operation is lower than a rated power of lamp 13 and has been supplied to lamp 13 for at least a certain period of time, this controller determines that a lamp refreshing process is required, and generates the power control signal and outputs the signal to ballast 12.

For instance, in the case where a power changing operation for changing the lamp power to a lower power than the rated power has been input and subsequently a power changing operation for changing the lamp power to a higher power than the rated power has not been input for at least a certain period of time, light intensity controller 101 determines that the lamp refreshing process is required.

When a power control signal indicating that the lamp refreshing process is needed is input from light intensity controller 101, ballast 12 performs control so as to increase the lamp power to the rated power and then return the power to the original power after elapse of a predetermined period of time.

Here, as described above, a discharge lamp is used as lamp 13. During the lighting of lamp 13, a halogen cycle occurs in which electrode material evaporated from electrodes of lamp 13 according to discharge between the electrodes adheres to the electrodes again by the action of halogen gas enclosed in the luminous tube of lamp 13. The rated power is a power causing a stable halogen cycle. The predetermined period of time is at least a time period required to recover the characteristics of lamp 13 due to the halogen cycle.

Light intensity controller 101 generates an amplitude control signal that changes the amplitude of an image signal such that the intensity of image light emitted from display element 15 becomes constant, in response to variation in lamp power, and outputs the signal to image signal controller 102.

Image signal controller 102 changes the amplitude of the image signal according to the amplitude control signal input from light intensity controller 101, and outputs the image signal with the changed amplitude to display element 15.

Figure 3:
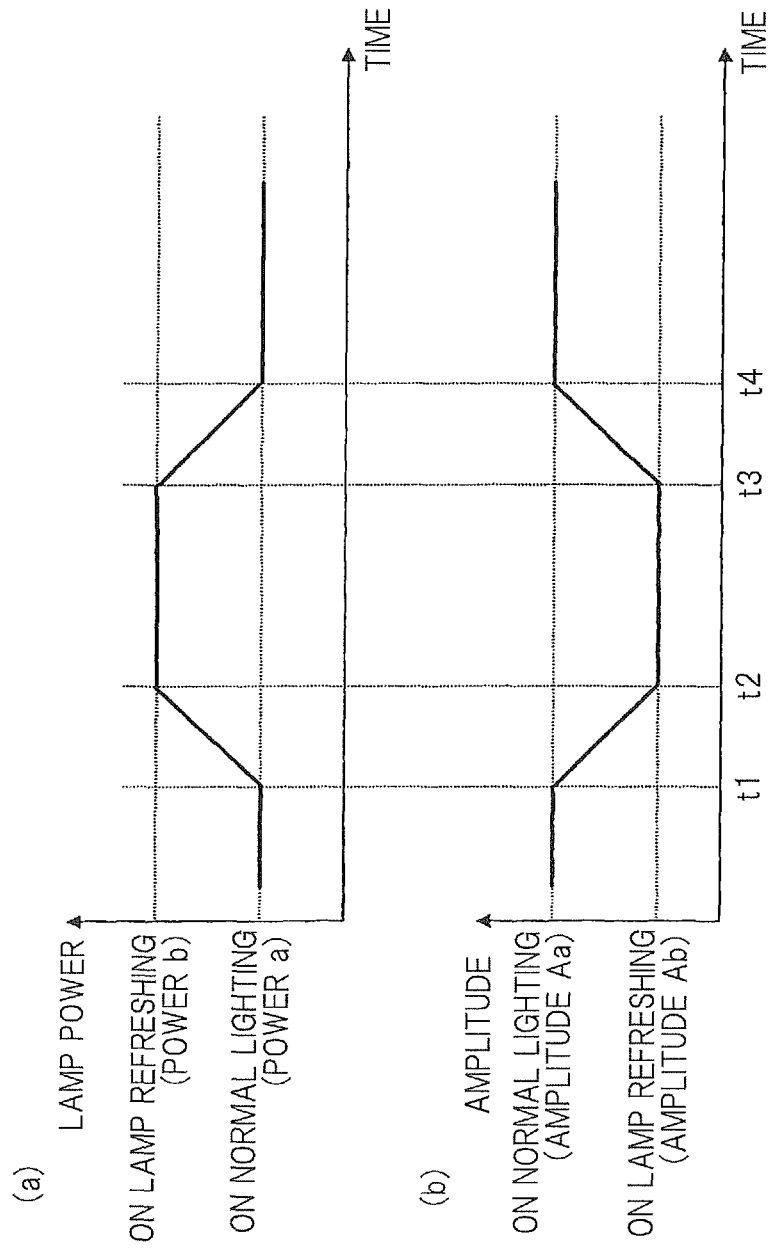
FIG. 3 is a diagram for illustrating an operation of the projection display apparatus shown in FIG. 2.

Next, an operation of projection display apparatus 100 will be described with reference to FIG. 3.

FIG. 3(a) is a timing chart of the lamp power. FIG. 3(b) is a timing chart of the amplitude value of the image signal.

Hereinafter, it is provided that, after projection of the image light is started, the power changing operation for changing the lamp power to lamp power that is lower than the rated power of lamp 13 is input from the outside.

Light intensity controller 101 outputs the power control signal to ballast 12 such that lamp power a is supplied to lamp 13, according to the power changing operation input from the outside. Light intensity controller 101 detects whether or not lamp power has been supplied to lamp 13 for at least a certain period of time.

At time t1, detecting that lamp power a is supplied at least a certain period of time, light intensity controller 101 determines that the lamp refreshing process is required, generates a power control signal indicating the lamp refreshing process is needed, and outputs the signal to ballast 12.

As shown in FIG. 3(a), according to the power control signal indicating the lamp refreshing process that is input from light intensity controller 101 is needed, ballast 12 increases the lamp power from lamp power a to lamp power b from time t1 to time t2, and then reduces the lamp power from lamp power b to lamp power a from time t3, which is the time after elapse of a predetermined time after time t2, to time t4, thereby performing the lamp refreshing process. Lamp power b is, for instance, the rated power of lamp 13.

Light intensity controller 101 outputs, to image signal controller 102, the amplitude control signal for changing the amplitude of the image signal such that the intensity of the image light becomes constant in response to variation in lamp power.

Here, provided that the lamp power is constant, the brightness of image light is the amplitude of the image signal to the gamma value (G)-th power. That is, provided that the brightness of image light in the case of amplitude A is Y, it is represented as $Y = A^{\wedge}G$. Gamma value G is a constant defined by the characteristics of display element 15 and the like.

Provided that the amplitude of the image signal is constant, the brightness of image light is in proportion to the lamp power. Accordingly, for instance, provided that the brightness of image light at lamp power a is Ya and that the brightness of image light at lamp power b is Yb, changing from lamp power a to lamp power b multiplies the brightness of image light by Yb/Ya times.

In order to cancel the variation in brightness of image light by Yb/Ya times due to the variation in lamp power, controlling the amplitude of image signal that multiplies the brightness of image light at lamp power a by Ya/Yb times is required.

As described above, the brightness of image light is the amplitude of the image signal to the gamma value-th power. Accordingly, provided that the amplitudes of image signals at lamp powers a and b are Aa and Ab, respectively, amplitude Ab is required in order to satisfy the following Equation (1).

$$Ab^{\wedge}G = (Ya/Yb) \cdot Aa^{\wedge}G \qquad \text{Equation (1)}$$

The brightnesses of image light Ya and Yb are in proportion to the lamp power. Accordingly, Equation (1) becomes following Equation (2).

$$Ab\hat{\ }G=(La/Lb)\cdot Aa\hat{\ }G \qquad \text{Equation (2)}$$

Equation (2) is changed to Equation (3).

$$Ab/Aa=(La/Lb)\hat{\ }(1/G) \qquad \text{Equation (3)}$$

In the case of changing from lamp power a to lamp power b, light intensity controller 101 inputs values La, Lb and G into Equation (3), respectively, and calculates the ratio Ab/Aa of the amplitudes of the image signals before and after the change of the lamp power.

Light intensity controller 101 includes a light intensity table that associates the lamp power with the output light intensity of lamp 13 at the lamp power, and refers to this light intensity table to acquire La and Lb.

After light intensity controller 101 calculates the ratio Ab/Aa of the amplitudes of the image signals, it generates an image control signal to multiply the amplitude of the image signal by Ab/Aa, and outputs the signal to image signal controller 102.

Image signal controller 102 multiplies the amplitude of the image signal by Ab/Aa according to the image control signal output from light intensity controller 101, and outputs the multiplied value to display element 15.

As shown in FIG. 3(a), from time t1 to time t2, lamp power a is changed to power b; from time t3 to time t4, lamp power b is changed to lamp power a. An image control signal according to the variation in lamp power is output from light intensity controller 101. As shown in FIG. 3(b), according to the image control signal, image signal controller 102 reduces the amplitude of the image signal from time t1 to time t2, in which lamp power a is increased to lamp power b, and increases the amplitude of the image signal from time t3 to time t4, in which lamp power b is reduced to lamp power a.

Thus, according to this exemplary embodiment, projection display apparatus 100 controls the amplitude of the image signal such that the intensity of the image light is constant in response to variation in lamp power. Accordingly, projection display apparatus 100 can suppress variation in brightness of the image light even if the lamp power varies.

In this exemplary embodiment, the description has been made using the example of calculating the amplitude of the image signal on the basis of Equation (3). However, the scope is not limited thereto. The amplitude value of the image signal may be changed to a degree such that the user cannot visually sense the brightness of image light.

Second Exemplary Embodiment

Figure 4:
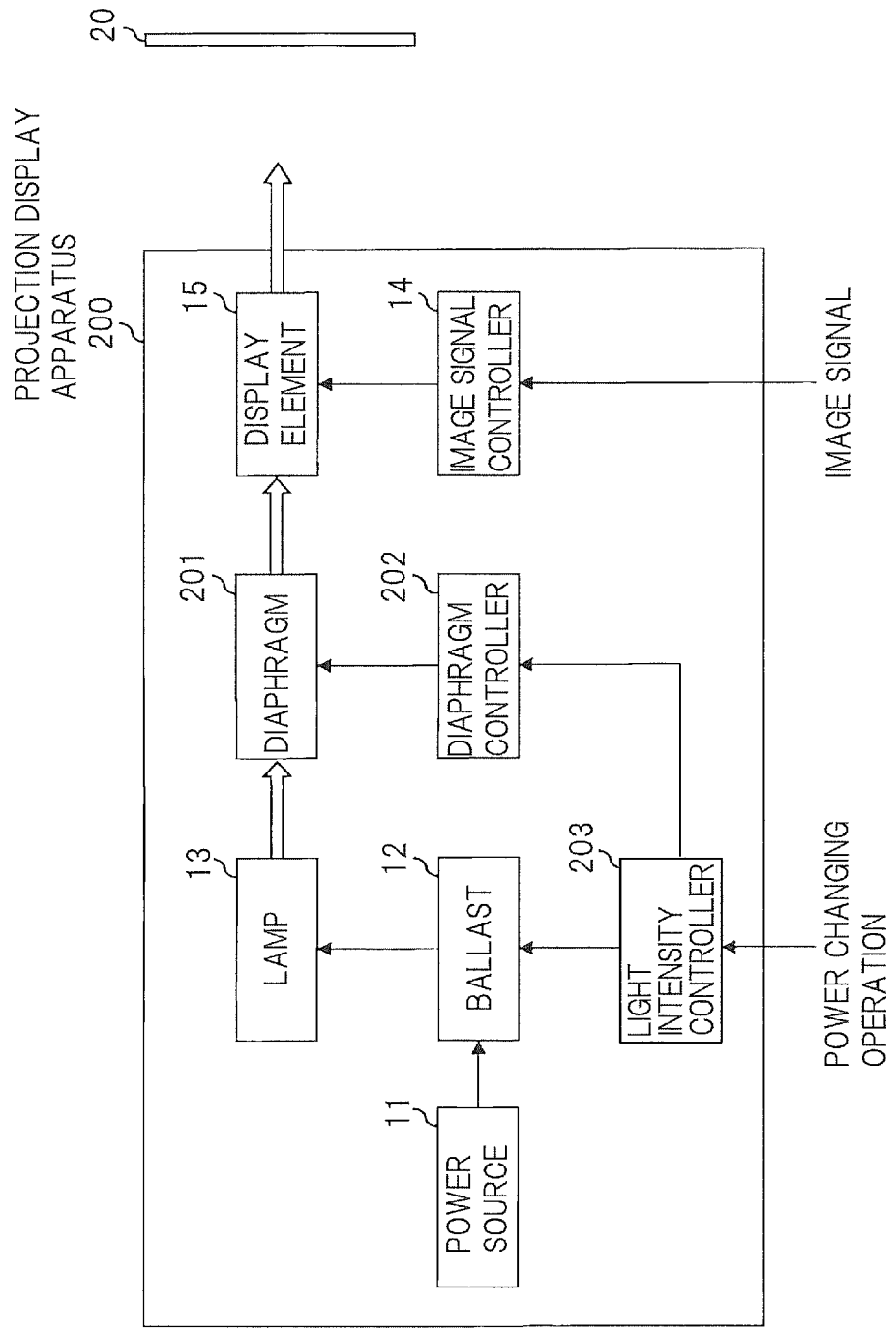
FIG. 4 is a block diagram showing a configuration of a projection display apparatus according to a second exemplary embodiment of the present invention.

FIG. 4 is a diagram showing a configuration of projection display apparatus 200 of a second exemplary embodiment. In FIG. 4, an outline arrow indicates a light flux.

Projection display apparatus 200 shown in FIG. 4 is different from projection display apparatus 100 of the first exemplary embodiment in that diaphragm 201 and diaphragm controller 202 is added, in that light intensity controller 101 is replaced with light intensity controller 203, and in that image signal controller 102 is replaced with image signal controller 14. The other components are analogous to projection display apparatus 10 or 100. The description thereof is omitted.

Diaphragm 201 is provided between lamp 13 and display element 15, and allows light emitted from lamp 13 to pass therethrough.

Diaphragm controller 202 controls the aperture of diaphragm 201 according to an aperture control signal input from light intensity controller 203.

Light intensity controller 203 generates the aperture control signal that makes the intensity of light that is allowed to pass through diaphragm 201 constant in response to variation in lamp power, and outputs the signal to diaphragm controller 202.

Provided that the intensity of light that is allowed to pass through diaphragm 201 at lamp power a is Ka and that the intensity of light that is allowed to pass through diaphragm 201 at lamp power b is Kb, Equation (4) must be satisfied in order to make the brightness of image light constant in the case of changing from lamp power a to lamp power b.

$$Kb/Ka=La/Lb \qquad \text{Equation (4)}$$

Light intensity controller 203 inputs La and Lb into Equation (4), calculates the ratio Kb/Ka of intensities of light that is allowed to pass through diaphragm 201 before and after variation in lamp power, generates the aperture control signal to multiply the intensity of light that is allowed to pass through diaphragm 201 by Kb/Ka times together with the lamp energy before and after the change, and outputs the lamp energy before and after the change to diaphragm controller 202.

Diaphragm controller 202 adjusts the aperture of diaphragm 201 such that the intensity of light that is allowed to pass through diaphragm 201 becomes the light intensity multiplied by Kb/Ka times, according to the aperture control signal. Diaphragm controller 202 includes, for instance, a passing light intensity table that associates the aperture of diaphragm 201 with the intensity of light that is allowed to pass through diaphragm 201 at each lamp output light intensity at the aperture. This controller refers to the passing light intensity table, and adjusts the aperture of diaphragm 201.

Figure 5:
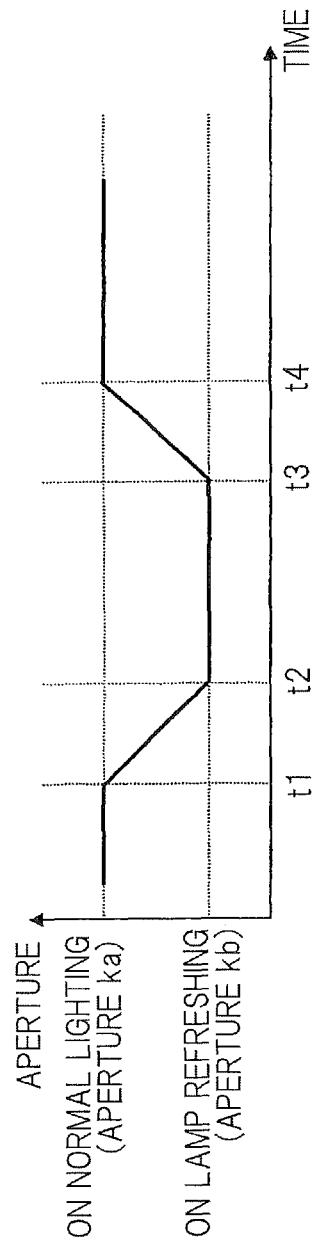
FIG. 5 is a timing chart of the aperture of a diaphragm of the projection display apparatus shown in FIG. 4.

FIG. 5 shows a timing chart of the aperture of diaphragm 201. The lamp power is changed as shown in FIG. 3(a). In FIG. 5, the same times are assigned with the same symbols as in FIG. 3(a).

As shown in FIG. 5, the aperture of diaphragm 201 decreases from time t1 to time t2, in which lamp power a is increased to lamp power b, and increases from time t3 to time t4, in which lamp power b is reduced to lamp power a.

As described above, projection display apparatus 200 of this exemplary embodiment controls the aperture of diaphragm 201 in response to variation in lamp power, thereby preventing any variation in brightness of image light.

The invention of this application has thus been described with reference to exemplary embodiments. However, the present invention is not limited to the exemplary embodiments. Various modifications that those skilled in the art can understand may be made in configurations or details of the invention of this application within a scope of the invention of this application.

The invention claimed is:

1. A projection display apparatus projecting image light based on an image signal, comprising:
   a lamp;
   a display element that modulates light emitted from said lamp according to an amplitude of the image signal, and that emits the light as the image light;
   a light intensity controller that changes a lamp power according to a power changing operation that is input from an outside so as to change the lamp power for driving said lamp, and, if the changed lamp power is lower than a rated power of said lamp and supplied to said lamp for at least a certain period of time, generates a control signal for causing a lamp refreshing process to be performed that increases the lamp power to the rated power and then reduces the lamp power to an original power after elapse of a predetermined period of time, identifies an amplitude value of the image signal where an intensity of the image light is constant before and after the change of the lamp power in said lamp refreshing process, and generates a control signal for changing the amplitude of the image signal to the identified amplitude value;

a ballast that drives said lamp and performs said lamp refreshing process according to the control signal, that causes said lamp refreshing process to be performed and that is generated by said light intensity controller; and an image signal controller that controls the amplitude of the image signal according to the control signal, that causes the amplitude of the image signal to be changed and that is generated by the light intensity controller, and supplies the image signal whose amplitude is controlled to said display element.

2. The projection display apparatus according to claim 1, wherein the predetermined period of time comprises at least a time period required to recover characteristics of said lamp due to a halogen cycle.

3. The projection display apparatus according to claim 1, wherein said light intensity controller identifies the amplitude value of the image signal based on a ratio of a lamp power when said lamp refreshing process is performed on a lamp power prior to a time when said lamp refreshing process is supposed to be performed.

4. The projection display apparatus according to claim 1, wherein said light intensity controller generates the control signal to cause said lamp refreshing process to be performed that increases the lamp power to the rated power from a first time to a second time and then reduces the lamp power to the original power from a third time, the third time being after elapse of a predetermined time after the second time to a fourth time.

5. The projection display apparatus according to claim 1, wherein said light intensity controller generates the control signal to cause said lamp refreshing process to be performed that increases the lamp power to the rated power from a first time to a second time and then reduces the lamp power to the original power thereafter.

6. The projection display apparatus according to claim 1, wherein said light intensity controller generates the control signal to cause said lamp refreshing process to be performed that increases the lamp power to the rated power then reduces the lamp power to the original power after the lamp power reaches the rated power.

7. The projection display apparatus according to claim 1, wherein said light intensity controller identifies the amplitude value of the image signal based on a ratio of a lamp power.

8. The projection display apparatus according to claim 1, wherein the ballast performs control so as to increase the lamp power to the rated power and then return the power to the original power after elapse of the predetermined period of time.

9. The projection display apparatus according to claim 1, wherein the amplitude of the image signal is changed so that the intensity of the image light is constant before and after the change of the lamp power in the lamp refreshing process.

10. The projection display apparatus according to claim 8, wherein the rated power comprises a power causing a stable halogen cycle, and
wherein the predetermined period of time is at least a time period required to recover characteristics of lamp due to the halogen cycle.

11. A control method of a projection display apparatus including a lamp and a display element that modulates light emitted from the lamp according to an amplitude of an image signal and that emits the light as image light, the method comprising:

causing a light intensity controller to change a lamp power according to a power changing operation that is input from an outside so as to change the lamp power for driving the lamp, and, if the changed lamp power is lower than a rated power of the lamp and supplied to the lamp for at least a certain period of time, to generate a control signal to cause a lamp refreshing process to be performed that increases the lamp power to the rated power and then to reduce the lamp power to an original power after elapse of a predetermined period of time, to identify an amplitude value of the image signal where an intensity of the image light is constant before and after the change of the lamp power in said lamp refreshing process, and to generate a control signal for changing the amplitude of the image signal to the identified amplitude value;

causing a ballast to drive said lamp and to perform said lamp refreshing process according to the control signal which causes said lamp refreshing process to be performed, the control signal being generated by said light intensity controller; and causing an image signal controller to control the amplitude of the image signal according to the control signal which causes the amplitude of the image signal to be changed, the control signal being generated by the light intensity controller, and to supply the image signal whose amplitude is controlled to the display element.

12. The control method of a projection display apparatus according to claim 11,
wherein the predetermined period of time comprises at least a time period required to recover characteristics of the lamp due to a halogen cycle.

13. The control method according to claim 11, wherein said causing said light intensity controller further causes said light intensity controller to identify the amplitude value of the image signal based on a ratio of a lamp power when said lamp refreshing process is performed on a lamp power prior to a time when said lamp refreshing process is supposed to be performed.

14. The control method according to claim 11, wherein said causing said light intensity controller further causes said light intensity controller to generate the control signal to cause said lamp refreshing process to be performed that increases the lamp power to the rated power from a first time to a second time and then reduces the lamp power to the original power from a third time, the third time being after elapse of a predetermined time after the second time to a fourth time.

15. The control method according to claim 11, wherein said causing said light intensity controller further causes said light intensity controller generates the control signal to cause said lamp refreshing process to be performed that increases the lamp power to the rated power from a first time to a second time and then reduces the lamp power to the original power thereafter.

16. The control method according to claim 11, wherein said causing said light intensity controller further causes said light intensity controller to generate the control signal to cause said lamp refreshing process to be performed that increases the lamp power to the rated power then reduces the lamp power to the original power after the lamp power reaches the rated power.

17. The control method according to claim 11, wherein said causing said light intensity controller further causes said light intensity controller to identify the amplitude value of the image signal based on a ratio of a lamp power.

18. The control method according to claim 11, wherein said causing said ballast further causes the ballast to perform control so as to increase the lamp power to the rated power and then return the power to the original power after elapse of the predetermined period of time.

19. The control method according to claim 18, wherein the rated power comprises a power causing a stable halogen cycle, and wherein the predetermined period of time comprises at least a time period required to recover characteristics of lamp due to the halogen cycle.

20. The control method according to claim 11, wherein the amplitude of the image signal is changed so that the intensity of the image light is constant before and after the change of the lamp power in the lamp refreshing process.

* * * * *